United States Patent [19] [11] 4,236,981
Demarthe et al. [45] Dec. 2, 1980

[54] HYDROMETALLURGICAL PROCESS FOR TREATING NICKEL MATTES

[75] Inventors: Jean-Michel Demarthe, Viroflay; Louis Gandon, Rambouillet; Monique Goujet, Versailles, all of France

[73] Assignee: Societe Metallurgique le Nichel-S.L.N., Paris, France

[21] Appl. No.: 54,888

[22] Filed: Jul. 5, 1979

Related U.S. Application Data

[60] Division of Ser. No. 849,603, Nov. 8, 1977, Pat. No. 4,173,502, which is a continuation of Ser. No. 649,744, Jan. 16, 1976, abandoned.

[30] Foreign Application Priority Data

Jan. 16, 1975 [FR] France .................................. 75 01264
Dec. 12, 1975 [FR] France .................................. 75 38166

[51] Int. Cl.³ ...................... C25C 1/08; C22G 23/04; C22G 3/00; C01G 53/04

[52] U.S. Cl. ..................... 204/113; 204/112; 204/117; 204/119; 75/82; 75/101 BE; 423/139; 423/140; 423/143; 423/395; 423/400

[58] Field of Search ............... 204/113, 112, 117, 119; 423/139, 140, 143, 395, 400; 75/82, 101 BE

[56] References Cited

U.S. PATENT DOCUMENTS 3,983,018 9/1976 Borbely et al. ..................... 204/113
4,016,054 4/1977 Gandon et al. ..................... 204/113

*Primary Examiner*—R. L. Andrews
*Attorney, Agent, or Firm*—Fleit & Jacobson

[57] ABSTRACT

This invention provides a process for treating a nickel matte to recover essentially pure nickel comprising: treating an aqueous mixture of the matte with chlorine to produce a solid residue and an aqueous lixiviating solution having a pH value which is substantially nil or positive; treating the lixiviating solution to produce a solution containing primarily nickel chloride; and electrolyzing the solution to recover pure nickel at the cathode.

13 Claims, 4 Drawing Figures

HYDROMETALLURGICAL PROCESS FOR TREATING NICKEL MATTES

This is a divisional of Ser. No. 849,603, filed Nov. 8, 1977, now U.S. Pat. No. 4,173,502, which is a continuation of Ser. No. 649,744, filed Jan. 16, 1976, now abandoned.

The present invention relates to a hydrometallurgical process for treating nickel mattes for the purpose of producing high purity nickel, that is containing less than approximately 0.05% of foreign elements, as well as for the recovery of cobalt.

It is known that mattes of this kind have a nickel content of the order of 75% by weight and that they also contain cobalt in proportions commonly comprising between 1.5 and 2%, as well as 2 to 4% of iron, for example, the remainder essentially comprising sulphur.

Numerous processes are known for the production of nickel from mattes and some of these processes make use of hydrometallurgy.

Among these processes is the process disclosed in French Pat. No. 1,284,737. This patent proposes lixiviation of copper and nickel mattes by means of very concentrated hydrochloric acid followed by purification of the solution obtained by means of solvents or of ion-exchange resins.

This process has two major disadvantages: on the one hand the emission of hydrogen sulphide which is very toxic and at the same time very corrosive, and on the other hand the production of excessively acid solution for direct electrolysis. A supplementary operation is thus required to separate the nickel chloride from hydrochloric acid. Other processes have been proposed to avoid these disadvantages.

French Pat. No. 2,138,330 describes the electrolytic production of nickel from a matte. This process essentially comprises roasting of the matte to eliminate the sulphur in the form of sulphur dioxide and to produce a nickel oxide, followed by dissolving of the impure oxide in hydrochloric acid, oxidation of the ferrous iron to ferric iron, a stage of purification by passing the solution over an anion-exchange resin, and, finally, an electrolysis of the solution thus obtained results in obtaining a deposit of nickel on the cathode and a release of gaseous chlorine at the anode.

Although this latter process represents a distinct advance with respect to the prior art, nevertheless it has a particular number of disadvantages, among which must be mentioned that it is necessary to perform a roasting operation on the matte, which is costly and gives rise to the formation of sulphur dioxide which is known to be a gas with an extremely polluting action. Moreover, this method entails the need to perform the synthesis of the hydrochloric acid used for the lixiviating action. This synthesis, based on chlorine released during the electrolysis stage, uses up hydrogen, which has an unfavourable effect on the economics of the process.

One solution of this problem involves in making direct use of chlorine to dissolve the metal values contained within the mattes. Among the many techniques of dissolving by means of gaseous chlorine is the lixiviation in an aqueous phase by means of chlorine and in the presence of the ferrous/ferric couple. This technique has been known for a long time; as long ago as 1934, U.S. Pat. No. 1,943,337 disclosed a lixiviating action in the aqueous phase of metal sulphides by means of chlorine in the presence of the ferrous/ferric couple to yield elementary sulphur and a solution of metal chloride. The major problem caused by the adoption of this process was the elimination of the ions of iron at the end of the lixiviating operation and in the recovery of the chlorine contained in the ferrous or ferric chloride, and these two operations should be performed whilst complying with the conditions implied above, these being; obtaining substantially neutral solution and preventing the release of toxic, noxious and/or polluting vapours.

Generally speaking, the extraction of ferric chloride from solutions of nickel chloride of low acidity is a problem which has never been resolved in a fully satisfactory manner. In the aforementioned French Pat. No. 2,138,330, it was proposed to make use of very basic ion exchange resins, but this technique, which is appropriate for solutions containing no more than a few grams of iron per litre, is unsuitable for high concentrations of ferric chloride so that it results in ion exchange plants of prohibitive size and cost.

French Pat. No. 2,130,115 proposes to bypass this difficulty by reversing the ferrous ion/ferric ion couple by the cuprous copper/cupric copper couple and by precipitating the latter in the form of the sulphide. This process has many disadvantages: it is inappropriate for mattes which are rich in iron and for mattes which are deficient in copper. Moreover, it involves a precipitation stage which is difficult to apply on an industrial scale.

One of the objects of the present invention, therefore, is the provision of a hydrometallurgical process for the treatment of nickel mattes, which prevents the release of noxious or polluting vapours.

Another object of the invention is to provide a process of the type specified above, which eliminates a neutralisation stage.

Another object of the invention is to provide a process of this kind which is less costly than the known processes with respect to the operating expenses as well as of investments.

One aspect of the invention consists in a process of this kind which allows for the valorisation of almost all of the metals present in appreciable quantity within the matte. By "valorisation", or any variation thereof, such as "valorise", "valorised", and "valorisable", as used herein, is meant giving value to that which previously had little or no value, and, in the present case, refers to the metals of little or no value present in the matte (i.e., metal values ordinarily not recovered and rendered commercially valuable, such as sulphur, nickel, iron, and cobalt) which are recovered and transformed into products having commercial value.

A supplementary aspect is a process of this kind possessing great flexibility with respect to the iron content of the matte, that is to say, which is applicable even if this content varies in a substantial manner.

In accordance with the invention, these objects and others which will emerge in the following, are accomplished by means of a process in which the initial matte is consecutively exposed to the following various stages:

(1) action on the matte in the divided condition by chlorine in an aqueous environment, in the presence of a mixture of ferrous and ferric chloride;

(2) at least partial elimination of the iron contained in the solution, by placing this latter in contact with an organic liquid-liquid exchange phase;

(3) elution of the liquid-liquid exchange phase by placing it in contact with an aqueous regenerating phase;

(4) elimination of metals other than nickel remaining within the solution; and (5) electrolysis of the solution thus purified, with precipitation on a cathode of high purity nickel.

The chlorine released during the electrolysis stage is advantageously recycled and used for action on fresh quantities of matte.

In a first embodiment of the invention, the stage of iron elimination initially comprises an oxidisation to the ferric state, preferably by means of chlorine, of the totality of the iron contained in the solution. The placing in contact with the liquid-liquid exchange phase is then performed in such manner as to eliminate the whole of the iron present in the solution. During the elution of this organic phase, a solution of ferric chloride is recovered, whereof a part is advantageously recycled to the stage of action by the chlorine, where the residue is withdrawn from the plant and may be sold.

In a second embodiment of the invention, the stage of iron elimination is performed in such manner as to obtain a no more than partial extraction of iron, and it is advantageous to allow a quantity of iron corresponding approximately to that which has initially been present in the matte to remain in the solution.

The process in accordance with the invention thus resolves the difficulty quoted above with respect to ferric chloride by recycling the same in the following manner: all of the ferrous ions in the nickeliferous solution emerging from the lixiviating stage are oxidized by reaction with chlorine to ferric chloride; the latter is then extracted selectively by means of an organic phase containing an appropriate neutral extractant of the tributyl phosphate (TBP) type. The organic phase is regenerated by means of an aqueous phase which, once charged with ferric chloride, is conveyed totally or partially towards the lixiviation stage, in which aqueous phase the chlorides formed are dissolved, after which lixiviation the aqueous phase is treated again by placing it in contact with the organic phase, which, on this occasion is in the regenerated form. The ferric chloride is thus constantly recycled and no loss of chloride need be feared. The mattes contain iron, however, which in the lixiviation stage, is converted into ferric chloride and which will thus enter in the iron circuit. This results in the accumulation of ferric chloride which raises the risk of being harmful to the satisfactory operation of the process. This is why the present invention has two features: either the withdrawal, prior to lixiviation, of a part of the aqueous phase charged with ferric chloride, or the extraction of no more than a part of the ferric chloride present in the nickeliferous solution emerging from the lixiviating stage, the quantity of iron withdrawn or allowed to remain in the nickeliferous solution preferably being substantially equal to that dissolved during the lixiviating stage. Since the tributyl phosphate extracts hydrochloric acid at least as well as it extracts ferric chloride, problems with respect to the accumulation of hydrochloric acid, which may be formed during the lixiviating stage, are as bad as problems with respect to the accumulation of ferric chloride referred to above.

This application of TBP for the extraction of ferric chloride from nickel chloride solutions of low acidity represents a surprise to one versed in the art, and, simultaneously, a particularly interesting instruction to the industrialist.

As a matter of fact, it has been believed until now that the presence of high concentrations of hydrochloric acid was essential for the extraction of ferric chloride by means of TBP, as see the review by E. Wigstall and K. Froyland "Solvent extraction and nickel metallurgy"; The Falconbridge Matte Leach Research (Antwerp Symposium of 1972).

During the research resulting in the present invention, the inventors have demonstrated, however, that under particular conditions, it was possible and even preferable to extract the ferric chloride from nickel chloride solutions of low acidity, i.e. having a pH value which is substantially nil or positive, by means of TBP. Moreover, one versed in the art would easily understand the profitability of making use of a solvent which, like TBP, has been used for decades in the industry, and in particular in the nuclear industry.

This solution would be fully satisfactory if, during the lixiviating stage, there was no parasitic oxidation of sulphur or oxidation of sulphides to the sulphate, which releases 8 protons, or $H^+$ ions, per atom of sulphur oxidised. The sulphate ion formed in this parasitic reaction may easily be eliminated by precipitation in the form of alkaline earth sulphate, as suggested by the aforementioned U.S. Pat. No. 1,943,337. By contrast, the protons formed by this parasitic reaction are numerous and raise the risk of disturbing the lixiviation process because of the accumulation phenomenon described above.

In view of what has been stated in the preceding, two solutions could then be envisaged: either to make use of TBP and impose such conditions that the parasitic reaction can hardly arise, or to select a solvent other than TBP, which extracts hydrochloric acid in small quantities only.

The inventors have discovered that particular measures render it possible to reduce the effect of the parasitic reaction considerably. These measures consist in: maintaining high concentrations of iron during the lixiviating reaction, selecting a relatively coarse grain size of the matte and, finally, maintaining the redox potential throughout the action at a value between 600 and 800 millivolts measured with respect to the hydrogen electrode.

Although the first two measures do not raise any inconvenience, the third is troublesome and results in an incomplete dissolution of the metal values contained in the initial matte, that is to say a dissolution to the extent of approximately 95%.

During numerous tests resulting in the present invention, it was discovered that the system formed by the three first stages of the process with the use of TBP, is self regulating with respect to the pH value; in other words, that the acidity of the aqueous phase remains at a relatively low level even if the sulphation rate, or percentage of atoms of sulphur converted into sulphate irons, is relatively high. As a matter of fact, in an unexpected manner, the lixiviation consumes acidity, without thereby causing the release of hydrogen sulphide.

It is not possible at present to provide a full explanation of this action, whereof the industrial potential is great, and which renders it possible to dissolve almost a totality of the metals initially contained in the matte, without this operation requiring a precise and permanent control of the redox potential or an adjustment of the rate of flow of the chlorine. It may be pointed out, however, that by virtue of the high concentration of iron ions, the redox potential of the solution tends to adjust itself automatically to around the normal apparent potential of the ferrous/ferric couple of say 770 millivolts with respect to the hydrogen electrode. The presence of chloride ion in high quantity may slightly modify this balance value. It is preferable, however, to reduce the rate of sulphation to the extent in which it does not disturb the solution of the metals contained in the matte.

This is why, prior to the stage of iron elimination, the iron content in the solution is preferably comprised between 5 and 100 grams per liter, and, preferably, is of the order of 50 to 60 grams per liter.

The crushed matte which is used as the starting material advantageously has a grain size of the order of 100 to 2,000 microns, and preferably between 500 and 1,000 microns.

As has been stated above, the lixiviation essentially converts the sulphides into sulphur and converts the sulphur into sulphate form in only a very partial manner. The residue thus essentially comprises elementary sulphur and it is tempting to attempt to valorise the same. However, even if the dissolution of the metals can be considered as almost total, the sulphur originating from the lixiviating action still contains a substantial proportion of metal. By way of information, it may be recalled that if a matte is treated which initially contains 20% of sulphur, a degree of dissolution of 96 to 98% implies a proportion of 10 to 15% of metallic impurities in the residual sulphur. To resolve this problem, the aforementioned U.S. Pat. No. 1,943,337 proposes selective dissolution of the sulphur by means of hot organic solvents, such as hot carbon disulphide, the metal impurities remaining in the solid phase in the form of sulphides which may undergo another lixiviating action. However, the use of organic solvents, which are frequently very inflammable and toxic, is both costly and dangerous.

In accordance with the invention these difficulties are resolved by submitting the residue to percolation by means of a solution of ferric chloride.

In accordance with one of the most advantageous methods of such percolation, the residue is placed in a fluidised bed, moving in counterflow to the solution of ferric chloride which comes direct from the stage of regeneration of the TBP, and which has previously been fed direct to the lixiviating stage. By way of information, the redox potential of the solution of ferric chloride, which is approximately 900 millivolts with respect to the hydrogen electrode at the beginning of the percolating action, amounts to no more than 800 millivolts approximately, at the end of this percolating action. The solution of nickel and iron chlorides issuing from this percolating action, may advantageously be fed to the lixiviating stage. Finally, the sulphur obtained contains no more than 2 to 3% of metal impurities and may be purified in conventional ways.

As for the stage of eliminating metals other than the residual nickel contained in the solution after at least partial elimination of iron, it is advantageously performed as in the first embodiment, by means of an extraction with a solvent, the latter preferably being a mixture of tri-isooctylamine and an aromatic diluent. By contrast, in the second embodiment, this stage will advantageously be performed by treatment with a strongly basic resin.

The second embodiment has the advantage of using already developed techniques, which are described in the aforementioned French Pat. No. 2,138,330, but has the disadvantage of being relatively costly with respect to investment and operating costs. The first embodiment has the advantage of being easy and relatively inexpensive to perform, but requires perfecting, since, to the inventors' knowledge, an extraction by means of a tri-isooctylamine has never been performed before at such high pH values. This extraction has the advantage, moreover, of directly providing a cobaltiferous solution which is almost pure, subject to the condition that the nickeliferous solution is free of iron. For a large size industrial plant, the most judicious selection consists in extracting the nickeliferous solution by means of an organic phase containing tri-isoctylamine. This selection assumes that the elimination of the ferric chloride formed during lixiviation of the matte would be performed by withdrawal of the aqueous phase derived from regeneration of the TBP. During this extraction, cobalt, zinc and copper pass from the nickeliferous solution into the organic phase. The organic phase is regenerated by means of an aqueous phase which reextracts the copper and the cobalt, the zinc requiring a basic elution. Making allowance for the composition of the mattes normally involved, the cobaltiferous solution contains no more than a few percent of copper relative to cobalt. In accordance with one other preferred method of extraction, the trade name "SOLVESSO 150", which is an oil fraction having a Mixed-Aniline Point of 15.0° C.; a Kauri-Butanol Value of 95; a composition of 98.0% by volume of aromatic hydrocarbons; a Bromine Number of 0.30; 1 ppm of Sulfur; a Flash Point of 151° F.; a Boiling Range of 362° F.–410° F.; and a Viscosity of 1.20 cp at 25° C. Nevertheless, the cobalt tri-isooctylamine complex is not soluble in this diluent, and this results in the forming of a second organic phase. It is known that this disadvantage may be avoided by adding a heavy alcohol, but, and this represents a teaching of the present application, it has been found that it was possible and even preferable to add TBP instead of the heavy alcohol, the quantity of TBP added being of the order of 4 to 8%. One versed in the art will appreciate the advantage of having one component less in the organic phase, the TBP being present perforce since it is entrained in the form of traces at least, from the stage of iron extraction to the stage of cobalt extraction by the nickeliferous solution.

One of the principal objects of the process is to produce nickel of very high purity. In particular applications, the presence of lead in the nickel could be troublesome, even in very small quantities and it was sought to obtain deposits containing lead in lesser proportions than 5 parts per million.

Following the extraction of iron and the elimination of cobalt, the nickeliferous solution still contains the totality of the lead initially present in the matte. However, in the major part of the matte to be treated, the lead is in sufficient quantity for its proportion in the deposit to exceed the value specified above.

The problem raised thus consists in reducing the lead content of the nickeliferous solution below approximately 1 mg per liter. If conventional methods were to be applied, this operation would be difficult to perform without at the same time eliminating a substantial proportion of the nickel chloride dissolved in the solution. This problem is resolved by means of an improvement in the process in accordance with the principal application which will be described in the following passages.

In accordance with the invention, the problem is resolved by exposing the nickeliferous solution to a partial electrolysis employing a soluble nickel anode.

The electrolysis is advantageously performed by means of a piston-type electrolysis cell. This term is understood to refer to a type of cell lacking any system of agitation apt to homogenise the solution completely. In other words, each fraction of a solution is displaced like a piston in a cylinder, without being mixed with the preceding fraction nor with the following fraction. In the cells of this type, the solution thus enters at one extremity, passes between the electrodes while being progressively denuded of lead, and issues wholly or partially purified at the other extremity.

The potential between the two electrodes advantageously lies between 0.3 and 0.6 volts.

At the end of the operation, the lead initially present in the solution is in the form of a deposit of nickel containing approximately 1% of lead. To recover the nickel contained in the deposit, it is possible to expose the deposit to a nitric dissolution which dissolves the lead and the nickel, and then to cause the impure nickel nitrate to crystallise and this may be pyrolzed to recover a valorisable but impure nickel oxide, and nitrous vapours which may serve the purpose of synthesising a fresh quantity of nitric acid.

It should be noted that the lead is not the only impurity liable to be eliminated in this manner: copper, cobalt, zinc and generally speaking, less reducing metal than nickel, may form the object of an electrolysis of this kind. Finally, it should be pointed out that the pH value of the nickeliferous solution rises during the electrolysis.

It has been observed that the appearance of arsenic, even in small quantities produced pollution of the deposit, whereas aluminium and chromium whilst not polluting the deposit, engender substantial internal strains in the latter during the electrolysis.

It is, therefore, necessary to keep these impurities below the limit of concentration which may be situated at around 1 mg. It is known, on the other hand, that it is a difficult operation to reduce the concentration of elements already present in the state of traces, particularly if it is attempted to prevent substantial loss of the other ingredients of the solution. For example, precipitation in the form of chromium and aluminium hydroxide causes the entrainment of a substantial fraction of nickel present in the solution, whilst yielding a precipitate which is difficult to filter out.

In accordance with the invention this problem is resolved by placing the nickeliferous solution originating from the lead extraction stage, in contact with an organic phase which contains at least one di-ester of phosphoric acid.

In particular, use may be made of the acids of the di-2 ethylhexyl phosphoric acids (D2 EHPA), and the acid used may be either extended by means of an appropriate diluent, such as the product sold under the trade name "ESCAID 100", which is an oil fraction having an Aniline Point of 62; a Kauri-Butanol Value of 35; a composition of approximately 80% of aliphatic hydrocarbons and 20% aromatic hydrocarbons; a Bromine Index of <300; <5 ppm of Sulfur; a Flash Point of 78° C.; a Boiling Range of 200° C.–250° C.; and a Viscosity of 1.9 cts. at 25° C.; or fixed on the resins in such manner as to form ion exchanger resins.

This technique renders it possible to eliminate at least 90% of the chromium, aluminium and arsenic, practically without nickel loss. The stages of electrolysis and of placing in contact with the D2 EHPA, may be interchanged and may be used for treating nickeliferous solutions of a composition equivalent to those treated in the process of the present addition.

As has been stated above, a substantial quantity of sulphate may be present in the nickeliferous solution. To eliminate this sulphate, this may be precipitated in the form of barium sulphate, the barium being added in the form of chloride and in a quantity slightly smaller than that which is stoichiometically required. This precipitation may occur at any point in the process, provided that it after the extraction of the iron.

BRIEF DESCRIPTION OF THE DRAWINGS

The following description, which is not limiting, will convey a clear grasp of the manner in which the present invention may be applied in practise. It should be perused with reference to the accompanying figures in which.

Figure 1:
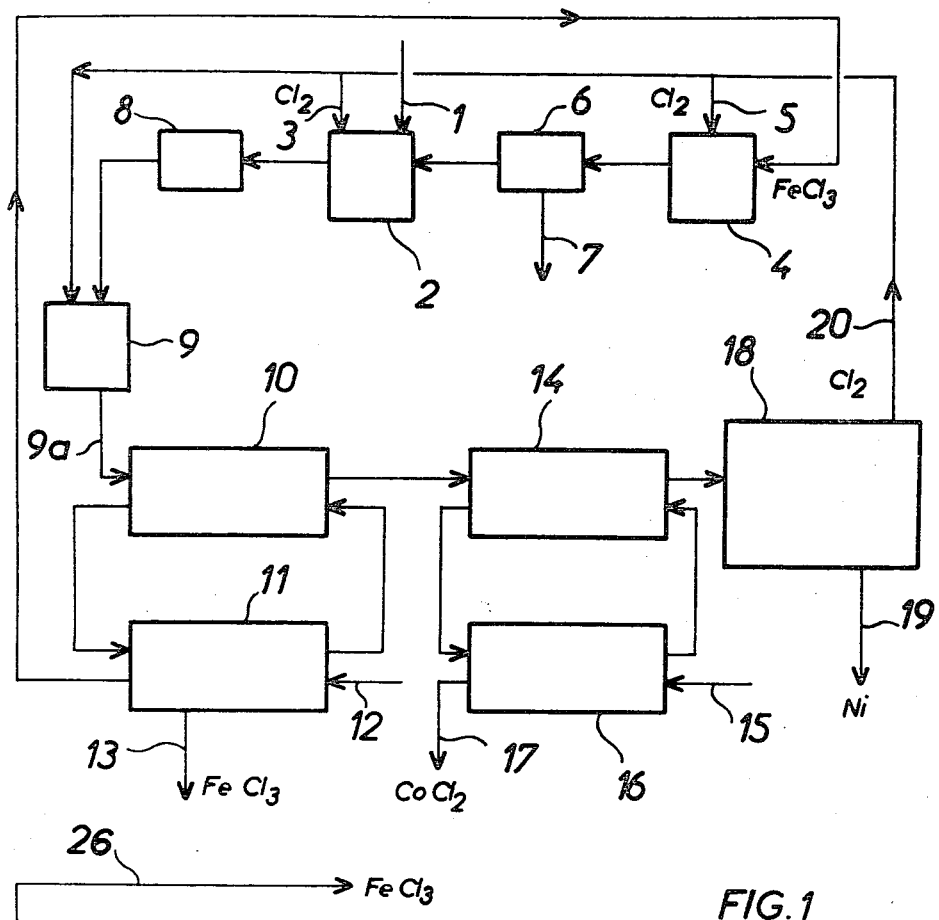
FIG. 1 illustrates the different stages of a process in accordance with the present invention, in a diagrammatic manner.
Figure 1:
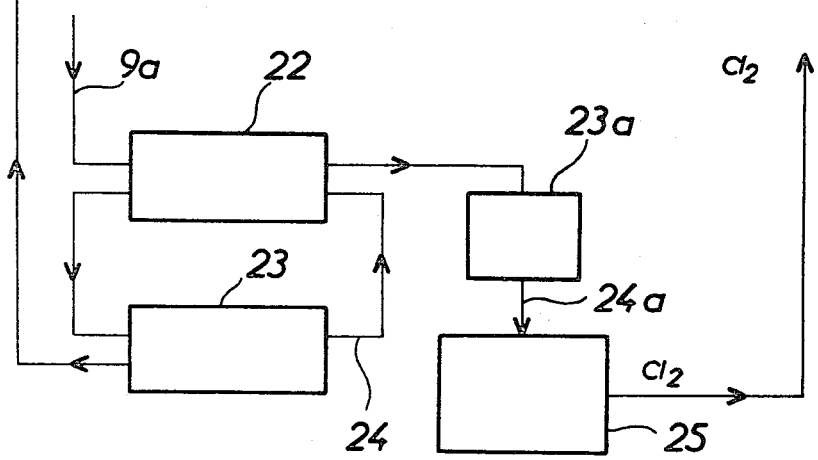

The process in accordance with the invention, in its first form of embodiment, will be described first of all with reference to FIG. 1. As apparent from this Figure, nickel matte 1 previously crushed to a grain size of the order of 100 to 500 microns, is fed into reactor 2 into which chlorine is injected at 3. The reactor 2 is connected to a second reactor 4 into which chlorine is also injected at 5 via a plant 6 for liquid-solid separation (which plant 6 may be a filtration plant) from which is extracted at 7 a residue essentially comprised of elementary sulphur. The solution emerging from the reactor 2 is exposed in 8 to a second liquid-solid separation, and at 9 to an oxidisation which may be performed by injection of chlorine. In a first battery of mixers and decanters 10, the solution is placed in contact with an organic phase for liquid-liquid extraction or "solvent" which is preferably, and as stated above, a mixture comprising a neutral extractant such as tributyl phosphate and an aromatic diluent. In these conditions the ferric chloride is totally extracted from the solution. The charged solvent is regenerated in a battery of mixers and decanters 11 by being placed in contact with an aqueous re-extraction phase 12, which may be water. In the battery 11 it is possible, as stated above, to perform a tapping operation for the production of pure ferric chloride, which tapping action preferably corresponds to approximately the quantity of iron brought in by the initial matte.

The nickeliferous solution thus denuded of iron is then exposed to an operation for extraction of cobalt which is performed in a battery of mixers-decanters 14. This extraction is preferably performed by means of an organic phase made up of tri-isooctylamine dissolved at the rate of 0.4 mole per liter, approximately, in an aromatic diluent, such as that sold under the trade names of "SOLVENT 200", which is an oil fraction having a Mixed-Aniline Point of 18° C.; a Bauri-Butanol Value of 89; a composition of 99% by volume of aromatic hydrocarbons; a Bromine Number of 0.6; 40 ppm of Sulphur; a Flash Point of 226° F.; a Boiling Range of 225° C.-285° C.; and a Viscosity of 2.670 cp at 25° C. The battery of mixers-decanters 14 comprises, for example, four stages, the aqueous phase to be purified and the organic solvent flowing in counterflow.

The solvent charged with cobalt, that is to say the organic phase containing tri-isooctylamine, is regenerated by being placed in contact with water fed in at 15 into a battery of mixers-decanters 16, to produce pure cobalt chloride at 17.

In the form of embodiment which has been described, the solution emerging from the oxidisation stage 9 was fed into a battery 10 of mixers-decanters in which the iron was extracted from the same totally. By contrast, in the second form of embodiment which is illustrated diagrammatically in the lower part of FIG. 1, this solution 9A is fed into a battery 22 of mixers-decanters, for example comprising two stages only, in which the solution is placed in contact with an organic phase preferably formed by a mixture of tributyl phosphate diluted in an aromatic solvent which may be that sold under the trade name of SOLVESSO 150, previously identified. The solvent and the diluent may be in equal quantities, the ratio between the rate of flow of the organic and aqueous phases being of the order of 1 to 2. The temperature during this operation is maintained within limits comprised between 15° and 60° C.

The organic phase which has been described may be regenerated by being placed in contact in a battery of mixers-decanters 23, with water which is fed in at 24 and which is charged with ferric chloride, which is recycled at 26 to the reactors 2 and 4 for dissolution of the matte.

The solution which is partially denuded of iron and emerges from the battery 22 of mixers-decanters, may be exposed to a total purification by causing the same to pass through a column 23 of a strongly basic anion-exchange polystyrene resin of the quaternary ammonium type with the trade name of "Amberlite IRA-400", which works in the chloride form, has an apparent density when dry of 0.7, has a capacity of 1.4 milliequivalents per milliliter of wet resin, and has a granule size between 0.38 and 0.45 millimeter.

As in the first form of embodiment, the solution 24A thus obtained, which is a solution of pure nickel chloride, may be exposed to an electrolysing action 25, the chlorine released during this operation being recycled to the reactors 2 and 4 for action on the matte.

Figure 4:
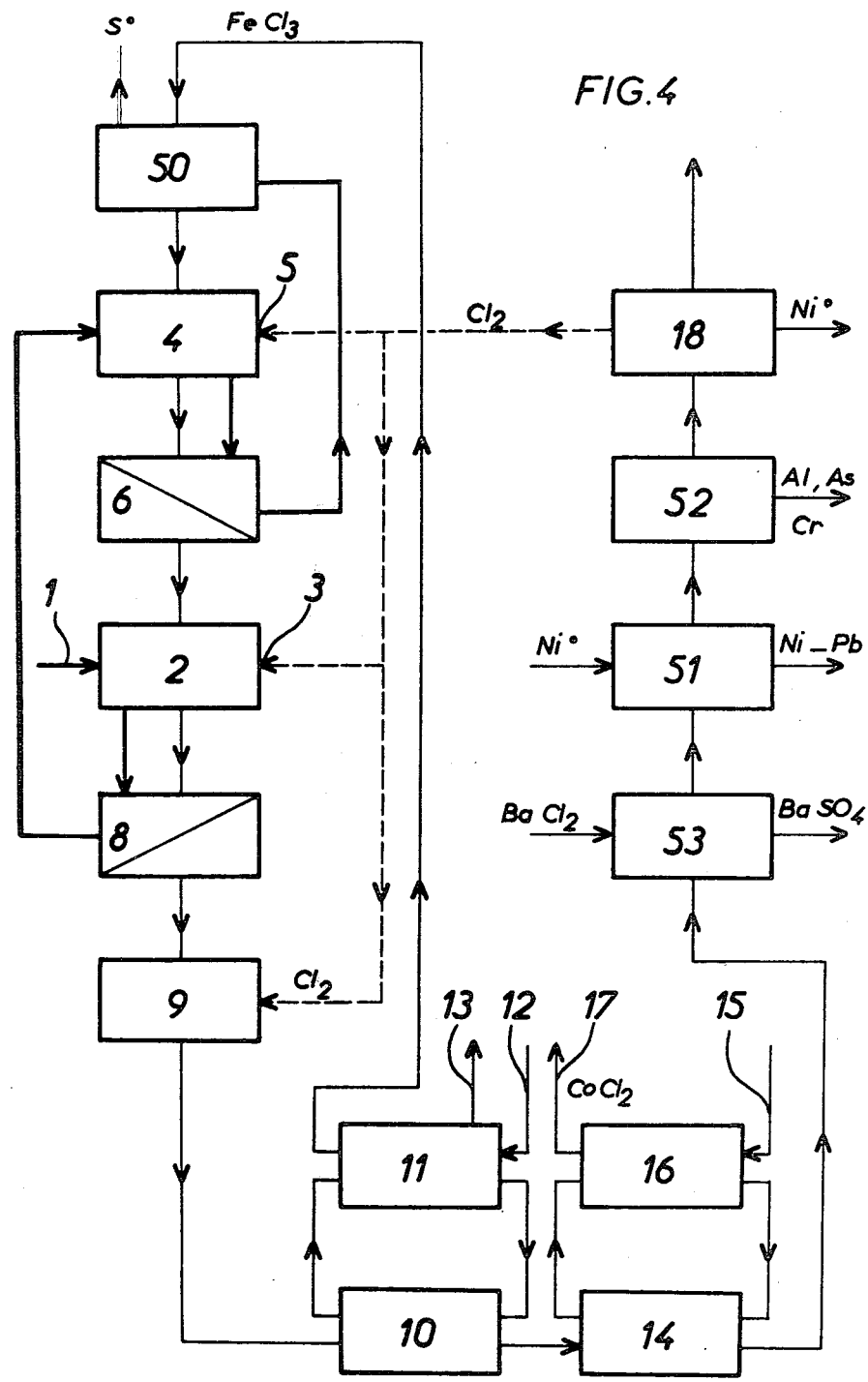
FIG. 4, in which the reference numerals already used in the preceding Figures have again been used, illustrates the different stages of the process according to one of the preferred methods of application of the present invention in a diagrammatical manner; the circuit of the matte is illustrated by means of a double line, the chlorine circuit by means of a dash-dot line, and the other circuits by means of a solid single line.

As is apparent from FIG. 4, the nickel matte and the solution of nickel and iron chlorides the origin of which will be specified further on, are fed into a reactor 2 into which chlorine is injected at 3. The solution emerging from the reactor 2 wherein matte which has not reacted remains in suspension, is exposed at 8 to a liquid-solid separation and then at 9 to an oxidisation which may be performed by an injection of chlorine.

The residue issuing at 8 is conveyed, at the same time as a solution of ferrous and ferric chlorides the origin of which will be specified later on, into a reactor 4 into which chlorine is also injected. The suspension issuing from the reactor 4 is conveyed into a liquid-solid separation plant 6 which may be a filtration plant from which is extracted at 7 a residue essentially comprised of elementary sulphur and a solution of nickel and iron chlorides. This latter, as has been stated above, is introduced into the reactor 2. The residue issuing at 7 is conveyed at the same time as a solution of ferric chloride, into a percolating plant 50, preferably operating in counterflow, from which issues purified sulphur and a solution of ferrous and ferric chlorides, which is fed into the reactor 4.

In a first battery of mixers and decanters 10, the solution emerging from 9 is placed in contact with an organic phase for liquid-liquid extraction, or solvent, which is preferably, as stated above, a mixture comprising a neutral extractant like tributyl phosphate and an aromatic diluent. In these conditions, the ferric chloride is totally extracted from the solution. The charged solvent is regenerated in a battery of mixers and decanters 11, by being placed in contact with an aqueous re-extraction phase 12, which may be water. As has been stated above, a tapping operation may be performed in the battery 11 for the production of pure ferric chloride, which tapping operation preferably corresponds to approximately the quantity of iron introduced by the initial matte.

the nickeliferous solution from which iron has been removed is then exposed to an operation for extraction of the cobalt, which is performed in a battery of mixers and decanters 14. This extraction is preferably performed by means of an organic phase made up of tri-isooctylamine dissolved at the rate of 0.4 mole per liter, approximately, in an aromatic diluent such as that sold under the trade name of SOLVESSO 150, previously identified. The battery of mixers-decanters 14 for example comprises four stages, the aqueous phase to be purified and the organic solvent flowing in counterflow.

The solvent charged with cobalt, that is to say the organic phase containing tri-isooctylamine, is regenerated by being placed into contact with water fed in at 15 in a battery of mixers-decanters 16, to produce almost pure cobalt chloride at 17.

The purified nickeliferous solution emerging from 14 is fed into a reactor 53, at the same time as barium chloride, and issues from the same denuded of its sulphate ions which have been precipitated in the form of barium sulphate. It is then fed into an electrolysis cell comprising a soluble nickel anode in which it undergoes an operation for removal of lead, the lead being removed in the form of a deposit of nickel containing approximately 1% of lead.

The nickeliferous solution thus denuded of lead is exposed to another purification by causing it to pass into an ion exchanger column the active elements of which consist of D2 EHPA acid. The solution denuded of traces of aluminium, chromium, and arsenic, is then electrolysed at 18, yielding nickel of very high purity 19 and chlorine 20 which is recycled to the lixiviation stage.

Those versed in the art will easily understand that the principal advantages of the method of production of electrolytic nickel which has been described, as compared to the process described in the French Pat. No. 2,138,330 cited in the foregoing, may be summarised as follows:

(1) This new process avoids the roasting of the matte, that is the trouble in acquiring the roasting furnace, and the conjoint forming of sulphur dioxide whose pollutant capacity is known. In view of this fact, this process eliminates the setting up of an auxiliary plant allowing, for example, for the synthesis of sulphuric acid from sulphur dioxide.

(2) The process allows the production of elementary sulphur which may be commercially valorised. It has been stated as a matter of fact, that the residue obtained in the plant 50 for liquid-solid separation (see FIG. 4). essentially comprises elementary sulphur.

(3) The process eliminates the synthesis of hydrochloric acid, which eliminates any consumption of hydrogen, being an element whose cost is subject to the fluctuations of that of energy.

(4) As for the metals produced, the process allows the valorisation of almost all the metals present in appreciable quantities in the initial matte, that is to say nickel which is recovered in the form of cathodes in the final electrolysis stage 18, or rather 25, as well as iron and cobalt which are obtained in the form of pure salts, the first at 13 and the second at 17.

The following examples, which do not have a limiting nature, will enable those versed in the art to determine the operating parameters which should be adopted in any specific

EXAMPLE 1

This example relates to the action on the matte illustrated at 2 and 4 in FIG. 1, and more specifically the effect of the grain size on the kinematics of dissolution.

The matte used has the following composition:
Nickel—75%
Cobalt—1.85%
Iron—0.7%
Sulphur—19.2%

Two samples of this matte are crushed, the one to less than 50 microns and the other to less than 120 microns. These two samples are injected separately into a 2 liter reactor equiped with a stirrer device, containing a solution of ferric chloride which contains 18 g of iron per liter and which is raised to a temperature of 98° C. In both tests, the potential is adjusted to a value equal to 700 millivolts, the reference zero being the potential of hydrogen, and this is kept constant throughout the tests, by means of the injection of gaseous chlorine into the reactor.

The yields shown in the following Table 1 are obtained at the end of 5½ hours.

TABLE 1

| Sample 1 | Sample 2 |
|---|---|
| Ni = 63% | Ni = 71.3% |
| Fe = 89.3% | Fe = 89.8% |
| Co = 59.8% | Co = 65.96% |
| S = 5.26% (converted into sulphate) | S = 8.47% (converted into sulphate) |

Consequently, it is observed that the fineness of the particles of the matte increases the yield of the action for a given time of reaction, or, to be more precise, accelerates the kinematics of dissolution.

EXAMPLE 2

This example equally relates to the stage in which the initial matte is acted upon, and it is intended to show the effect of the potential on the yield of the dissolution and on the selectivity of this dissolution with respect to sulphur.

Four samples coming from the same nickel matte as in Example 1 above are crushed to 188 microns and are injected into a reactor equiped with a stirrer device which contains ferric chloride in the same concentration as that given above, and brought to a temperature equal to 80° C.

For each test, the rate of flow of chlorine is adjusted in such manner as to keep the potential costs down, the value of this potential being different from one test to another. At the end of five hours, results collated in the Table 2 below were obtained.

TABLE 2

|  | Sample 1 | Sample 2 | Sample 3 | Sample 4 |
|---|---|---|---|---|
| Potential | 530 mV | 700 mV | 910 mV | 950 mV |
| Yield of dissolution of nickel | 54.2% | 63% | 91.3% | 89% |
| Yield of conversion of sulphur into sulphate | 5% | 5.26% | 7.5% | 17% |

It is thus apparent that the increase in potential corresponds to an increase in the yield of dissolution as far as nickel is concerned. Nevertheless, this action is accompanied by an increase in the yield of oxidation of sulphur to the sulphate condition. Thus, in each particular case, a compromise will have to be found between these two actions, as a function of the aims it is proposed to accomplish.

EXAMPLE 3

LIke the two preceding examples, this Example relates to the stage in which the matte is acted upon in accordance with the invention. More specifically, its purpose is to demonstrate the effect on the rate of dissolution of the potential of the solution during this stage.

The initial product used is a nickel mat having a grain size smaller or equal to 128 microns, which is fed in continuously for 5 hours into a reactor containing a solution of ferric chloride containing 80 g of iron per liter. During a total period of 7 hours, the reactive mixture is kept at a constant temperature of 95° C., the injection of chlorine being controlled in such manner that it allows a predetermined nominal potential to be maintained. Three tests are performed, in which this potential is equal to 700, 750 and 800 millivolts, respectively, with respect to the hydrogen electrode.

The following Table 3 shows the rate of dissolution of the nickel present in the matte, the rate of conversion into sulphate of the elementary sulphur contained in the matte, as well as the nickel content and sulphur content of the filtrate obtained for each of these values.

TABLE 3

| Potential | 700 mV | 750 mV | 800 mV |
|---|---|---|---|
| Rate of dissolution of Nickel | 74% | 87.7% | 93.6% |
| Rate of conversion of Sulphur | 2.6% | 5.2% | 7.6% |
| Contents of the filtrate obtained: |  |  |  |
| in nickel (g/l) | 112.7 | 132.3 | 141.0 |
| in sulphur (g/l) | 0.8 | 1.8 | 2.6 |

It is apparent from this table that the rate of dissolution of nickel during the phase of action, rises as a function of the potential as well as the rate of forming of the sulphates in solution. Those versed in the art will easily grasp that it is thus easy to select the nominal potential for the action, as a function of the results it is wished to obtain.

EXAMPLE 4

As in the preceding cases, this example relates to the phase of action on the matte, and more specifically to the effect exercised on the rates of dissolution by the concentration of iron in the acting solution.

The operating method is the same as in Example 3 but in this case the potential is maintained at a constant value equal to 750 millivolts, whilst several tests are performed with variation of the iron content in the solution of ferric chloride during the action. More specifically, three tests are performed with iron contents equal to 20, 60 and 80 g per liter, respectively. The Table 4 below shows the rate of dissolution of nickel, the rate of conversion of sulphur of the matte into sulphate in the solution, as well as the nickel and sulphate contents of the filtrate, as a function of the quantity of iron fed in.

TABLE 4

| Quantity of iron fed in g/l | 20 | 60 | 80 |
|---|---|---|---|
| Rate of dissolution of nickel | 78.6% | 83.6% | 87.7% |
| Rate of conversion of sulphur into sulphate | 11.4% | 07.2% | 05.2% |
| Nickel content of the filtrate (g/l) | 120.4 | 124.7 | 132.3 |
| Sulphur content of the filtrate (g/l) | 4.1 | 2.5 | 1.8 |

This example shows that, for one and the same potential, the rate of dissolution of nickel raises the function of the iron content, whereas the rate of formation of sulphates in the solution obtained decreases.

EXAMPLE 5

This example, like the following one, relates to the application of the complete process performed continuously on an experimental scale.

Figure 2:
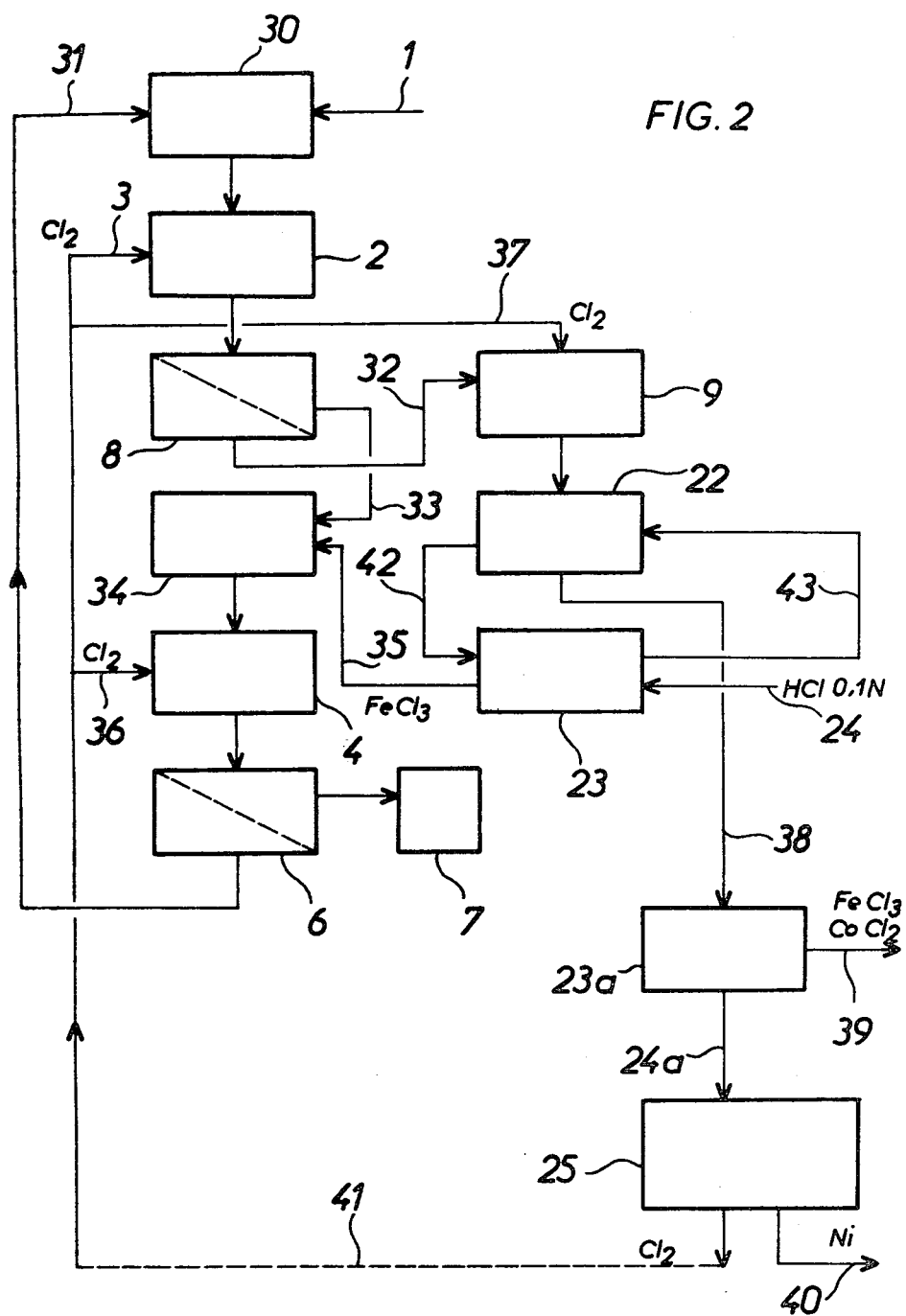
FIGS. 2 and 3 illustrate two numerical examples of application of the same process in more specific manner.

This example is illustrated very diagrammatically by means of FIG. 2 in which the reference numerals already used for FIG. 1 have been re-used.

Nickel matte, previously crushed to a grain size smaller than 125 microns, is fed in at the rate of 80 g per hour into a reactor 30 for placing the matte fed in in suspension by means of 400 milliliters per hour of a solution of ferric chloride whose origin will be specified subsequently. The matte thus placed in suspension is fed into a first lixiviation reactor 2 in which it remains for approximately 6 hours at a temperature of 95° C., the reactor 2 being fed at 3 on the other hand with gaseous chlorine whereof the rate of flow is selected in such a manner that the oxido-reduction potential remains constant and equal to 700 millivolts in the reactor 2.

The product issuing from the lixiviation reactor 2 is fed continuously into a filtration plant 8 from which issues on the one hand a solution 32 the subsequent treatment of which will be specified further on, and on the other hand a solid residue 33 which is fed into a device for placing the same in suspension 34. Ferric chloride whose origin will also be specified further on, is also fed into this latter device at 35.

The suspension thus obtained is then fed into a second lixiviation reactor 4 which is maintained at 95° C. and in which it remains for approximately 6 hours. Gaseous chlorine is fed into this reactor at 36 at a rate of flow such that the oxidoreaction potential is constant therein and equal to 800 millivolts. The product of this operation is finally fed into a filtration device 6 from which issues, on the one hand, a residue 7 essentially comprising elementary sulphur and, on the other hand, a solution of ferrous and ferric chlorides, at the rate of 400 milliliters per hour which as has been stated above, is recycled at 31 at the level of the plant 30 for placing the matte in suspension.

It is also apt to observe that the lixiviation reactors 2 and 4 have a capacity of the order of 2 liters and operate in cascade, the solid residue 33 of the first being recycled into the second. Moreover, it has been stated above that the residue 7 issuing from the filtration device 6 essentially comprises elementary sulphur. Nevertheless, it also contains a little nickel in the form of sulphide and this latter could by recycled into one of the two lixiviation reactors 2 or 4 after separation of the elementary sulphur, either by fusion or by dissolution in a solvent such as trichloroethylene.

The solution emerging from the first filtration reactor 8 is first oxidized at 9 in a reactor into which chlorine is fed at 37 at a rate of flow such that the oxido-reduction potential of the solution is constant and equal to 900 millivolts, approximately, which ensures a total oxidization of the iron. The solution thus oxidized is then exposed to a partial iron extraction operation in a battery 22 of mixers-decanters in which it is placed in contact with an organic phase formed by tributylphosphate diluted in equal proportions with an organic diluent sold under the trade name SOLVENT 200, previously identified. The ratio between the volume of the aqueous phase and that of the organic phase is equal to 1.5, the rate of flow of organic phase amounting to 600 milliliters per hour for its part. The aqueous solution 38 which had been partially denuded of iron at 22 is then exposed to a total purification by being passed through a plant 23a containing the ion exchanger resin sold under the trade name "Amberlite IRA-400C" which is identical to previously identified "Amberlite IRA-400", except that the granular size ranges between 0.45 and 0.65 millimeter. A solution 39 is thus obtained, on the one hand, which essentially contains ferric chloride and cobalt chloride, and a solution of purified nickel chloride 24a which is then electrolyzed at 25 to provide pure nickel 40 and gaseous chlorine 41. This latter is recycled at 31 to the device for placing the matte 30 is suspension, at 3 to the first lixiviation reactor 2, and at 37 to the oxidation reactor 9.

The organic phase 42 emerging from the battery 22 of mixers in which it had been charged with part of the iron contained in the aqueous solution 32, is regenerated in a second battery of mixers-decanters 23 in which it is placed in contact with a solution 24 of approximately deci-normal hydrochloric acid. This latter is charged with ferric chloride contained in the organic phase, and may be recycled at 35 to the stage 34 for placing in suspension of the solid residue coming via the filtration part 8 from the first lixiviation reactor 2. The regenerated organic phase 43 may be used in the first battery of mixers-decanters 22 for partial extraction of iron from fresh quantities of the aqueous solution 32.

The analytical results given in the following Tables 4A to 4C correspond to continuous periods of operation of the plant equal to approximately 100 hours and relate on the one hand to the initial matte (Table 4A), on the other hand, to the residues actually obtained in the two filtration plants 8 and 6 (Table 4B), and finally to the analysis of the principal solutions recovered, that is to say the solutions 32, 31, 38 and 24a (Table 4C).

TABLE 4A

| Analysis of the initial matte | |
|---|---|
| Elements | Contents in % |
| Ni | 77.5 |

TABLE 4A-continued

| Analysis of the initial matte | |
|---|---|
| Elements | Contents in % |
| Co | 1.62 |
| Fe | 1.90 |
| S | 17.8 |

TABLE 4B

| Analysis of the residues obtained. | | |
|---|---|---|
| References (FIG. 2) | 33 | 7 |
| Elements (%) | | |
| Ni | 32.7 | 12 |
| Co | 0.17 | 0.13 |
| Fe | 0.17 | 0.15 |
| $S_{total}$ | 46.7 | 66.9 |

The sum of the different contents is approximately 80% in each of the tables above. The residual 20% corresponds to the humidity.

TABLE 4C

| Analysis of the solutions obtained. | | | | | |
|---|---|---|---|---|---|
| References (FIG. 2) | 32 | 31 | 38 | 24a | FeCl₃ |
| Elements (g/l) | | | | | |
| Ni | 167.5 | 53.5 | 170 | 160 | 3.0 |
| Co | 2.4 | n.d. | 2.5 | $4 \cdot 10^{-3}$ | n.d. |
| Fe total | 59.0 | 53.7 | 4.3 | $2 \cdot 10^{-3}$ | 56.5 |
| Fe+ | 51.0 | 10.0 | 0 | — | n.d. |
| H+ | 0.56 | 1.6 | 0.05 | 0.05 | 0.45 |
| S total | 1.25 | 1.35 | 1.2 | | n.d. |

It is also appropriate to note that, in this examples, the yield of dissolution of the nickel contained in the initial matte amounts to 96%.

EXAMPLE 6

Figure 3:
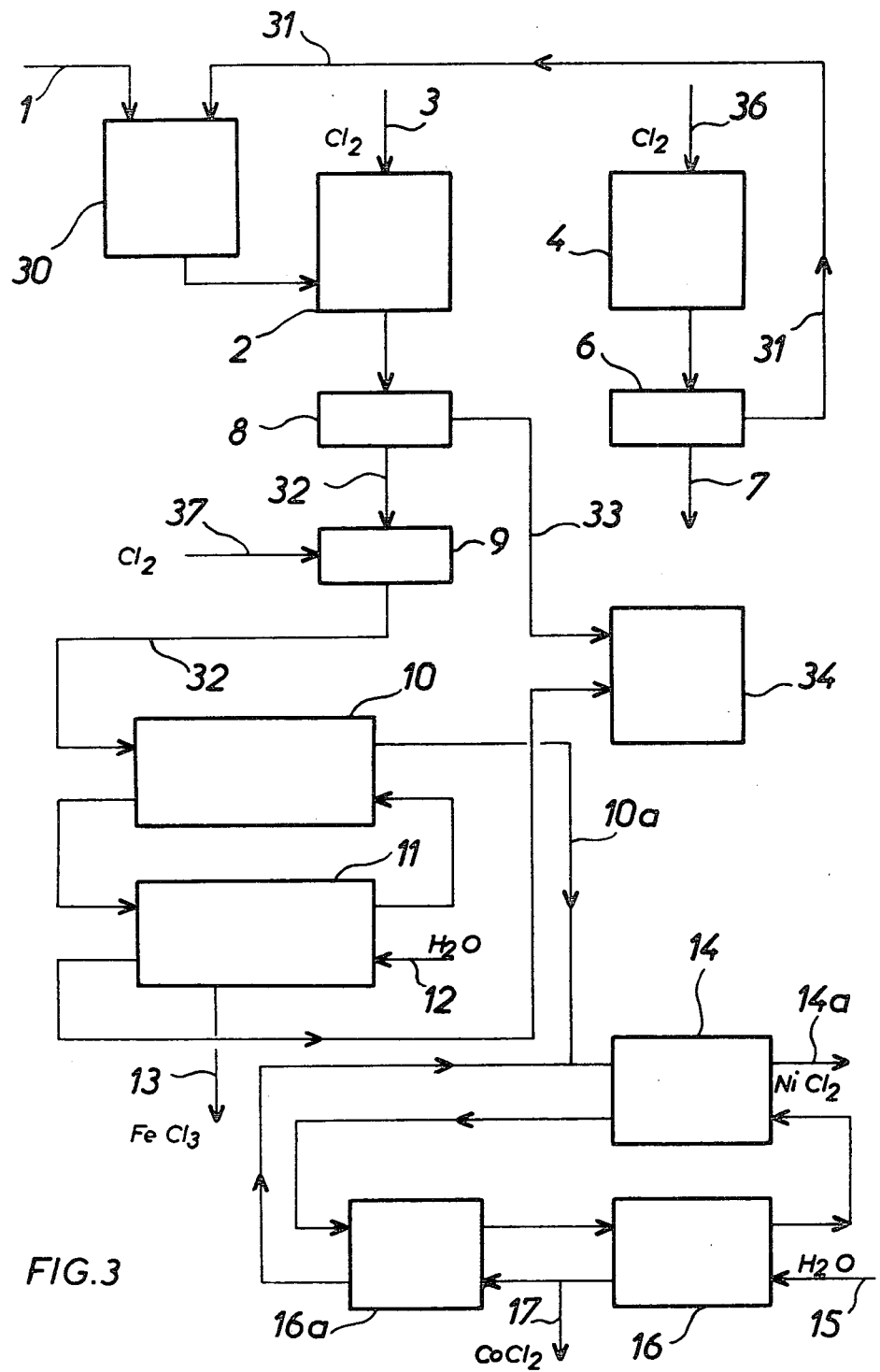

This example is analogous to the preceding one, but corresponds to the form of embodiment illustrated in the upper part of FIG. 1, that is to say, that the stages of partial iron extraction 22 and total over-resin extraction 23 are replaced, respectively, by a stage of total iron extraction by means of an organic solvent, and by a complementary purification stage by means of a second organic purification phase. The preceding stages, that is to say that of lixiviation and oxidization, being identical to those of the preceding example, will be described in very summary manner. In any event, the principal stages of the process in accordance with the present example are illustrated diagrammatically in FIG. 3, in which the same reference numerals have been used to denote the stages or flows of products which correspond to those of the preceding Figures.

Thus are apparent again consecutively, the placing in suspension of the matte 30, the first lixiviation 2, the first filtration 8, the second lixiviation 4, the second filtration 6, the oxidization 9, the extractions 10 and 14, as well as the regenerations 11 and 16 with, for this latter, a complementary washing stage 16a. The characteristics of the different liquid-liquid exchange stages are given in the following Table 5.

TABLE 5

| Stages | Number of stages | O/A | Operating phase |
|---|---|---|---|
| Extraction of iron (10) | 4 | 1.5 | TBP+solvent 200 (50/50) |
| Regeneration 11 | 4 | 1.5 | H₂O |
| Extraction of cobalt 14 | 4 | 0.8 | TIAO (0.4 in solvent) |
| Regeneration 16 | 4 | 8 | H₂O |
| Machine 10 | 2 | 100 | H₂O |

In the above Table 5, the notations TBP and TIOA, respectively, represent tributylphosphate and triisooctylamine. It should be noted moreover, that each of the stages of the table is operated in counterflow, the rate of flow of circulation of the aqueous phases being equal to 400 milliliters per hour. Finally, it is pointed out that the expression O/A represents the ratio between the rate of flow of the organic phase and that of the aqueous phase for each stage. On the other hand, as has been stated above, pure ferric chloride may be drawn off at the level of the battery of exchangers 11 at the rate of 75 milliliters per hour. The purified solutions of nickel chloride 14a and cobalt chloride 17 issuing, respectively, from the extraction stage 14 and regeneration stage 16, may be exposed to an electrolysis for the purpose of recovering the corresponding metals, this stage not having been shown in FIG. 3.

The results of analytical operations performed on the different solutions obtained during this test are shown in the following Table 6.

TABLE 6

| Reference (FIG. 3) | 31 | 32 | 35 | 10a | 14a | 17 | 13 |
|---|---|---|---|---|---|---|---|
| Ni g/l | 27.6 | 168 | 1.3 | 170 | 166 | 0.33 | 0.0 |
| S g/l | 0.65 | 1.8 | 0.24 | n.d. | n.d. | 0.1 | 0.1 |
| Fe g/l | 32.4 | 36 | 32 | $1.6 \cdot 10^{-3}$ | $1.6 \cdot 10^{-3}$ | 0.03 | 39.4 |
| Co g/l | 0.46 | 3.6 | 0.02 | 3.9 | $2.10^{-3}$ | 48.6 | 0.00 |
| H+N | 0.52 | 0.7 | 0.5 | 0.13 | 0.14 | 0.1 | 0.3 |

In the preceding Table 6, 10a and 14a respectively denote the solution denuded of iron issuing from the stage 10 for extraction of the iron, and the purified solution of nickel chloride issuing from the stage 14 for extraction of the cobalt.

The analysis of the final residue 7 obtained at the outlet of the filtering operation 6, which itself follows a second lixiviation 4 is the following:
Ni: 12.5%
S: 82.0%
Co: 0.67%
Fe: 0.22%

On the other hand, it is of importance to note that the mean yield of lixiviation amounts to approximately 97% in this example.

EXAMPLE 7

This example relates to a test of an action performed in an intermittent manner in a reactor of 1 m³. This reactor is equipped with a stirrer revolving at a 100 revolutions per minute, with a chlorine injection distributor situated below the stirrer, and with a reflux cooler topping the same. 700 liters of a solution of nickel chloride and ferric chloride containing 118 g per liter of nickel and 50 g per liter of iron is fed into the same, this solution being raised to a temperature of 95° C. 80 kilograms of a matte of nickel containing 76.2% of nickel, 20% of sulphur, and 1.6% of iron is then fed into the same after which 68 kilograms of chlorine is injected into the same during 5 hours. The oxido-reduction potential with respect to the hydrogen electrode being maintained at 700 millivolts. During the last half hour, the value of the potential rises to 770 millivolts. The exothermic nature of the reaction causes a rapid rise in the temperature which rises to the boiling point at atmospheric pressure, of say 107° C. During the operation, the heat is eliminated by the reflux cooler. At the end of the test, 825 liters of solution containing 175 g per liter of nickel are collected. The yield of nickel in solution amounts to 96.7%, whereas no more than 2% of sulphur has been solubilized in the form of sulphate.

EXAMPLE 8

A study of the extraction of ferric chloride by means of TBP from nickeliferous solutions of low acidity.

This investigation was conducted by placing 200 cm³ of an organic phase comprising 50% of TBP and 50% of previously identified "SOLVESSO 150" in contact with 200 cm³ of an aqueous phase containing chlorides of nickel, ferric iron and hydrogen. These two phases were stirred for a quarter of an hour at ambient temperature. The organic phase is then placed in contact with another 200 cm³ of the aqueous phase. The operation is repeated as many times as required until the composition of the aqueous phase is no longer modified by being placed in contact with the organic phase. The organic phase is then analyzed.

The results obtained are collated in the following table. The nickel concentration in the organic phase which is always substantially nil, does not appear in these table.

| Composition of the aqueous phase in g/l | | | Composition of the organic phase in g/l | |
|---|---|---|---|---|
| $Ni^{++}$ | $H^+$ | $Fe^{3+}$ | $Fe^{3+}$ | $H^+$ |
| 0 | 0.100 | 0.100 | 0.0100 | 0.0000 |
| 0 | 0.100 | 1.000 | 0.1200 | 0.0000 |
| 0 | 0.100 | 10.000 | 1.0000 | 0.0010 |
| 0 | 0.100 | 50.000 | 4.0000 | 0.0600 |
| 0 | 0.100 | 100.000 | 26.0000 | 0.1500 |
| 0 | 0.100 | 150.000 | 51.0000 | 0.2000 |
| 0 | 0.300 | 0.100 | 0.0150 | 0.0000 |
| 0 | 0.300 | 1.000 | 0.2000 | 0.0000 |
| 0 | 0.300 | 10.000 | 1.5000 | 0.0030 |
| 0 | 0.300 | 50.000 | 11.0000 | 0.1750 |
| 0 | 0.300 | 100.000 | 29.0000 | 0.3200 |
| 0 | 0.300 | 150.000 | 48.0000 | 0.3000 |
| 0 | 0.500 | 0.100 | 0.0200 | 0.0000 |
| 0 | 0.500 | 1.000 | 0.2500 | 0.0000 |
| 0 | 0.500 | 10.000 | 2.0000 | 0.0050 |
| 0 | 0.500 | 50.000 | 15.0000 | 0.3000 |
| 0 | 0.500 | 100.000 | 30.0000 | 0.4000 |
| 0 | 0.500 | 150.000 | 45.0000 | 0.3500 |
| 100.000 | 0.100 | 0.100 | 0.1500 | 0.0000 |
| 100.000 | 0.100 | 1.000 | 1.5000 | 0.0200 |
| 100.000 | 0.100 | 10.000 | 10.0000 | 0.1250 |
| 100.000 | 0.100 | 50.000 | 40.0000 | 0.1500 |
| 100.000 | 0.100 | 100.000 | 60.0000 | 0.1200 |
| 100.000 | 0.100 | 150.000 | 70.0000 | 0.870 |
| 100.000 | 0.300 | 0.100 | 0.3500 | 0.0500 |
| 100.000 | 0.300 | 1.000 | 3.5000 | 0.1400 |
| 100.000 | 0.300 | 10.000 | 12.0000 | 0.3100 |
| 100.000 | 0.300 | 50.000 | 30.0000 | 0.3800 |
| 100.000 | 0.300 | 100.000 | 46.0000 | 0.3000 |
| 100.000 | 0.300 | 150.000 | 63.0000 | 0.2750 |
| 100.000 | 0.500 | 0.100 | 0.6000 | 0.0700 |
| 100.000 | 0.500 | 1.000 | 6.0000 | 0.2000 |
| 100.000 | 0.500 | 10.000 | 22.0000 | 0.4100 |
| 100.000 | 0.500 | 50.000 | 37.0000 | 0.6000 |
| 100.000 | 0.500 | 100.000 | 49.0000 | 0.4500 |
| 100.000 | 0.500 | 150.000 | 60.0000 | 0.4000 |
| 200.000 | 0.100 | 0.100 | 0.3000 | 0.0000 |
| 200.000 | 0.100 | 1.000 | 2.0000 | 0.1100 |
| 200.000 | 0.100 | 10.000 | 21.0000 | 0.1670 |
| 200.000 | 0.100 | 50.000 | 51.0000 | 0.3600 |
| 200.000 | 0.100 | 100.000 | 67.0000 | 0.1100 |
| 200.000 | 0.100 | 150.000 | 71.000 | 0.0600 |
| 200.000 | 0.300 | 0.100 | 0.6000 | 0.0000 |
| 200.000 | 0.300 | 1.000 | 5.5000 | 0.1100 |
| 200.000 | 0.300 | 10.000 | 29.0000 | 0.3300 |
| 200.000 | 0.300 | 50.000 | 46.0000 | 0.4750 |
| 200.000 | 0.300 | 100.000 | 64.000 | 0.2600 |
| 200.000 | 0.300 | 150.000 | 68.000 | 0.2000 |
| 200.000 | 0.500 | 0.100 | 1.2000 | 0.1000 |
| 200.000 | 0.500 | 1.000 | 12.0000 | 0.2800 |
| 200.000 | 0.500 | 10.000 | 32.0000 | 0.4250 |
| 200.000 | 0.500 | 50.000 | 45.0000 | 0.6000 |
| 200.000 | 0.500 | 100.000 | 54.0000 | 0.3500 |
| 200.000 | 0.500 | 150.000 | 64.0000 | 0.2500 |

It is apparent from the preceding table that, in the presence of a sufficient quantity of nickel (100 to 200 g/l of nickel), the extraction of iron for considerable quantities of this metal, vary as a reciprocal function of the acid concentration. This point is of importance since it renders it possible to demonstrate that, in the process in accordance with the invention, by virtue of the low acidity, it is possible to saturate the solvent in a more substantial manner, thus to make use of low ratios between the organic phase and the aqueous phase (O/A).

As demonstrated by the preceding example, the extraction of iron and that of the hydrochloric acid are not in a stoichiometrical ratio. More specifically, it is possible to extract more iron than acid (quantities expressed in moles) by controlling the ratio between the organic and aqueous phases.

Thus, for a solution of low acidity, with the application of low O/A ratios, the solvent is saturated with iron in such a manner as to minimize the coextraction of hydrochloric acid.

EXAMPLE 9

Study of the different factors affecting the dissolution of the mat.

Intermittent lixiviation in a 2 liter reactor:

| Operating Parameters | | | |
|---|---|---|---|
| Test No. | 1 | 2 | 3 |
| potential mV | 700 | 700 | 700 |
| granulometry | $<125\mu$ | $<600\mu$ | $<600\mu$ |
| temperature | 95° | boiling | 95° |
| iron concentration | 50 g/l | 50 g/l | 50 g/l |
| rate of flow of matte inflow | 80 g/h | 80 g/h | 80 g/h |
| reaction period | 7 h | 7 h | 7 h |
| % S | 19.4 | 20 | 17.1 |

| Analytical Results | | | | |
|---|---|---|---|---|
| | | 1 | 2 | 3 |
| filtrate | Ni g/l | 99 | 115.9 | 78.9 |
| | S g/l | 1.64 | 0.9 | 1.1 |
| | $H^{30}$ (1) | 0.25N | <0.1N | <0.1N |
| residue | Ni % | 50 | 38.3 | 64.6 |
| | S % | 38 | 50 | 34 |

(1) The action being performed intermittently, the acidity is that caused by the action, that is to say the difference between the acidity of the filtrate and that of the initial solution of ferric chloride.

|  | 1 | 2 | 3 |
|---|---|---|---|
| rate of dissolution of nickel |  |  |  |
| calculation A |  |  |  |
| $\frac{\text{Ni in the filtrate}}{\text{Ni filtrate + Ni residue}}$ | 0.67 | 0.77 | 0.60 |
| calculation B $1 - \frac{\% \text{ Ni residue} \times \% \text{ S matte}}{\% \text{ Ni matte} \times \% \text{ S residue}}$ |  | 0.82 | 0.58 |
| proportion of S in the filtrate |  |  |  |
| $\frac{\text{S in the filtrate}}{\text{S filtrate + S residue}}$ | 0.06 | 0.04 | 0.04 |

Conclusions

The effect of the grain size: for the same conditions of action when the grain size rises from 125µ to 600µ, the rate of dissolution of the nickel diminishes by 0.1, but the selectivity of the dissolution of nickel with respect to sulphur increases.

Influence of the temperature: boiling appears to promote the action of nickel if the operation is intermittent but, in continuous operation, if the lixiviation is performed at boiling point, foams are formed which will flow off by overflowing, carrying away matte which has not been treated.

Influence of the sulphur content of the matte: the reduction by 2 points of the sulphur content reduces the reactivity of the matte.

EXAMPLE 10

Removal of lead by electrolysis

The electrolysis was performed in a parallelepipedal cell, with separation of the cathodic and anodic compartments by membranes installed in baffle fashion. In each of the three cathodic compartments, the stirring of the solution is performed by means of a compressed air diffuser; the compressed air enters via the double bottom of the cell, and is dispersed via a sheet identical to that used for membranes.

The cell comprises four anodes, three cathodes arranged in the three intervals delimited by the four anodes, and six membranes.

The cathodes are formed by four strips of metal braid, more commonly referred to as multiknit, of 18/8 stainless steel containing 3% of molybdenum. The dimension of the cathode being 15 cm by 15 cm, the projected cathodic surface amounts to 2.25 dm$^2 \times 2$–4.50 dm$^2$.

The anodes are of very pure nickel.
Dimensions of the cell:
length: 17 cm
width: 15 cm
height: 36 cm
nickel anode: 27 cm $\times$ 14 cm
cathode of stainless "Knit" of 15 cm $\times$ 15 cm
cathodic surface: $2 \times 2.25 = 4.50$ dm$^2$
depth of the anodic compartment: 1.5 cm
depth of the cathodic compartment: 2.0 cm Operating Conditions apparent current density: 66 A/m$^2$
voltage across the cell terminals: 0.50 to 0.55 V
anode-cathode voltage: 0.30 to 0.40 V
temperature: 80° C.
pH value: 3 to 4

The cell is filled with a solution to be treated, after which the electrolysis is started with different rates of flow.

The first table shows the lead concentration issuing from the cell and the end of variable periods measured from the beginning of the electrolysis.

The second table shows the state of static operation.

| rate of flow | Time | 0 | 5' | 10' | 20' | 30' | $\log \frac{Co}{c}$ |
|---|---|---|---|---|---|---|---|
| 24 l/h | (Pb)mg/l | 12.0 | 2.0 | 1.5 | 1.0 | 0.5 | 1.38 |
| 52 l/h | (Pb)mg/l | 14.0 | 3.0 | 3.0 | 2.5 | 2.5 | 0.75 |
| 81 l/h | (Pb)mg/l | 10.0 | — | 4.0 | 4.0 | 4.0 | 0.40 |

| Cathodic compartment rate of flow | inlet | 1 | 2 | 3 (outlet) |
|---|---|---|---|---|
| 24 l/h | 12 mg/l | 4.0 mg/l | 2.0 mg/l | 0.5 mg/l |
| 52 l/h | 14 mg/l | 6.5 mg/l | 3.5 mg/l | 2.5 mg/l |

For the rate of flow of 24 l/h, the solution of nickel chloride is totally denuded of lead and the loss of nickel is 0.19%. Electrical power consumed across the cell terminals:

$$9 \text{ A.h.} \times 0.5 V = 4.5 \text{ W.h}$$

Electrical power calculated per unit of volume of solution:

$$4.5/24 \text{ i.e. } 0.19 \text{ W.h/l or } 0.10 \text{ kWh/m}^3$$

EXAMPLE 11

Purification by liquid-liquid extraction

This example relates to the purification of a solution of nickel chloride containing chromium and aluminium, by means of a 10% solution of EHPA in previously identified "ESCALD 100".

At ambient temperature, in a decanting flask, a contact has been established between the aqueous phase and the organic phase, the ratio between the volumes being equal to one part of aqueous phase to four parts of organic phase.

This example is intended to demonstrate the influence of the pH value on the extraction of chromium and aluminium. Composition of the aqueous solution to be purified:
Nickel—200 g/l
Aluminium—7 mg/l
Chromium—6.4 mg/l

| pH value of the aqueous solution to be purified | 2.0 | 2.5 | 3.0 | 3.5 | 4 |
|---|---|---|---|---|---|
| Composition of the aqueous phase after contact with the solvent |  |  |  |  |  |
| Al mg/l | <1 | <1 | <1 | <1 | <1 |
| Cr mg/l | 0.8 | 0.5 | 1.1 | 0.8 | 0.5 |
| Purification yield |  |  |  |  |  |
| Al % | >85 | >85 | >85 | >85 | >85 |
| Cr % | 85 | 92 | 82 | 85 | 92 |

This example demonstrates the possibility of extracting the chromium and aluminium from a solution of nickel chloride originating from the action on the matte after an operation stripping the solution of iron and of cobalt by means of solvents.

EXAMPLE 12

Purification by separation over resin

This example is intended to show the level of purification of a solution of nickel chloride containing chromium and aluminium, by simple stirring of the solution with a resin whereof the active elements consist of D2 EHPA. (diethylhexyl phosphoric acid).

The H$^+$ ions of the resin are first exchanged against Ni$^{+2}$ ions at a pH value of 5, after which 20 ml of resin in the form (D2 EHPA)$_2$ Ni are placed in contact with 25 ml of NiCl$_2$ which should be purified.

Four tests were performed at pH values of the solution to be purified which amounted to between 2.5 and 4; the results are the following:

| pH value of the solution to be purified | | 2.5 | 3.0 | 3.5 | 4.0 |
|---|---|---|---|---|---|
| Solution to be purified Impurities introduced | Al | | 0.14 mg | | |
| | Cr | | 0.128 mg | | |
| Purified solution Impurities contained | Al mg | <0.080 | <0.030 | <0.030 | <0.030 |
| | Cr mg | <0.016 | <0.016 | <0.016 | <0.016 |
| Yield of purification in % | Al | >78 | >78 | >78 | >78 |
| | Cr | >92 | >92 | >92 | >92 |

This example demonstrates that the Ni ions fixed in the form (D2 EHPA)$_2$Ni may be replaced by the chromium and aluminium ions contained in the solution of nickel chloride to be purified.

EXAMPLE 13

Purification by percolation over resin

A resin whose active elements consist of D2 EHPA, is treated with a solution of nickel chloride at a pH value of 5, in such manner as to convert all of the active elements in the form (D2 EHPA)$_2$Ni.

The percolation of NiCl$_2$ at a pH value of 3.3, enables us to calculate the capacity of this resin in respect of the impurities Cr-Al-As-Zn.

A "b.v." is the apparent volume of the quantity of dry resin used.
Percolation speed—3 bv/h
Ambient temperature
Bed of resin 200 ml in a column of a height of 700 mm
Composition of the solution to be purified
Ni—200 g/l
Cr—6.4 mg/l
Al—7 mg/l
Zn—7 mg/l
As—10 mg/l
pH—3.3

Composition of the solution percolated:

| | Cr mg/l | Al mg/l | Zn mg/l | As mg/l |
|---|---|---|---|---|
| 1 bv | <0.3 | <1 | 0.7 | <0.3 |
| 2 | " | " | | |
| 2 | " | " | | |
| 3 | " | " | | |
| 4 | " | " | | |
| 5 | " | " | 3.8 | <0.3 |
| 6 | " | " | | |
| 7 | " | " | | |
| 8 | " | " | | |
| 9 | " | " | | |
| 10 | " | " | 5.7 | <0.3 |

Capacity of the resin
greater or equal to 30 mg of chromium or aluminium per liter of resin at 10 bv
greater or equal to 48 mg of arsenic per liter of resin at 10 bv
greater or equal to 6.5 mg of zinc per liter of resin at 10 bv

EXAMPLE 14

Purification by percolation over resin

This example and the following one, relate to the complete cycle, reestablishment of the medium, exhaustion, elution, and representing the purification of the solution of nickel chloride on an experimental scale.
resin 1 bv=200 ml
temperature=70° C.
Reestablishment of the medium by percolation of NiCl$_2$ at pH value 4. The ions of the resin are exchanged totally by Ni$^{++}$ and what is formed is (D2EHPA)$_2$Ni
speed of percolation: 6 bv/h
volume percolated: 60 bv
Exhaustion:
speed of percolation: 2 bv/h
volume percolated: 80 bv
Elution:
speed of elution: 2 bv/h
volume of 6 N HCl percolated: 10 bv
H$_2$O: rinsing until the disappearance of H$^+$ ions-3 bv Results

| Exhaustion Volume | Cr mg/l | Al mg/l | As mg/l |
|---|---|---|---|
| 10 bv | <0.8 | 2 | 0.35 |
| 20 bv | " | " | 0.10 |
| 30 bv | " | " | 0.15 |
| 40 bv | <0.6 | " | 0.55 |
| 50 bv | " | " | 0.90 |
| 60 bv | " | " | |
| 70 bv | " | " | |
| 80 bv | <0.4 | "0.20 | |

| Elution by 6N HCl Volume | Cr mg/l | Al mg/l | As mg/l |
|---|---|---|---|
| 1 bv | 65 | 625 | |
| 2 bv | 79.5 | 174 | 53.8 |
| 3 bv | 86 | 71 | 47.3 |
| 4 bv | 62.5 | 46 | 6 |
| 5 bv | 30.5 | 22 | 2 |
| 6 bv | 19 | 13 | 0.9 |
| 7 bv | 12 | 8 | 0.4 |
| 8 bv | 7 | 5 | 0.4 |
| 9 bv | 5.3 | 3.5 | <0.05 |
| 10 bv | 4.3 | 2.5 | <0.05 |

EXAMPLE 15

Purification by percolation over resin.

As in the preceding example, this example relates to the complete cycle of operation of the resin, but the restoration of the medium is performed by means of NaCl.
resin: 1 bv=200 ml
temperature: 40° C.

Restoration of the medium by percolation of NaCl at 100 g/l and at pH 7 after restoration of the medium, the D2 EHPA of the initial resin will be present in the form of a mixture of D2 EHPA in the H+ form and of (D2 EHPA)Na
speed of percolation: 2 bv/h
volume percolated: 10 bv
Exhaustion: speed of percolation: 2 bv/h
volume percolated: 190 bv
Elution: speed of elution: 2 bv/h
6 N HCl volume of elution: 10 bv
$H_2O$ until the disappearance of the H+ ions

Results

Exhaustion

| Volume | Cr mg/l | Al mg/l | As mg/l |
|---|---|---|---|
| 10 bv | <0.7 | <3 | |
| 20 bv | " | " | |
| 30 bv | " | " | |
| 40 bv | <0.8 | <2.6 | |
| 50 bv | " | " | |
| 60 bv | " | " | |
| 70 bv | " | " | |
| 80 bv | " | " | |
| 90 bv | " | " | |
| 100 bv | " | " | |
| 110 bv | " | <2 | |
| 120 bv | " | " | <0.4 |
| 130 bv | " | " | " |
| 140 bv | " | " | " |
| 150 bv | " | " | " |
| 160 bv | " | " | " |
| 170 bv | 1.2 | " | " |
| 180 bv | 2.3 | " | |
| 190 bv | 3.1 | 2 | |

| | Volume | Cr mg/l | Al mg/l | As mg/l |
|---|---|---|---|---|
| Elution | 1 bv | 190 | 840 | 270 |
| | 2 bv | 310 | 200 | 130 |
| | 3 bv | 52.5 | 24 | 1.4 |
| | 4 bv | 18.5 | 8 | 2.3 |
| | 5 bv | 8.3 | 2.3 | 2.0 |
| | 6 bv | 4.5 | 1.3 | |
| | 7 bv | 3 | <0.4 | |
| | 8 bv | 2 | " | |
| | 9 bv | 1.5 | " | |
| | 10 bv | 1.3 | " | |

| Balance of impurities | incoming | eluted |
|---|---|---|
| Cr | 190 | 144 |
| Al | 214 | 119 |

This test shows that the purification of the nickel chloride solution containing aluminum, chromium and arsenic is complete up to 190 bv.

EXAMPLE 16

This example corresponds to the complete application of the process in accordance with the accompanying figure.

The rates of flow and analytical results collated in the following tables correspond to periods of operation of the plant equal to approximately 100 hours in continuous operation and they relate to the initial matte on the one hand, and on the other hand to the residue actually obtained in the filtering plant, and finally the analysis of the principal solutions recovered.

Apart from the data given in the tables, it may be stated that the rate of dissolution of the nickel contained in the matte is at least equal to 99.5%, that 2 kg/h of chlorine should be added in the chlorine circuit apart from that generated by electrolysis, and that the reactor 53 consumes 2.7 kg/h of barium chloride. In conclusion, the elimination of zinc is not illustrated.

| COMPOSITION AND RATE OF FLOW OF | | | | |
|---|---|---|---|---|
| | the mat entering the reactor 2 | the cleanser 13 | sulphur emerging from the reactor 50 | eletrolytic nickel issuing from 18 |
| Nickel | 77% | — | 2% | >99.97% |
| Sulphur | 18% | — | — | <5 ppm |
| Sulphate | — | — | — | — |
| Iron | 2.4% | 40 g/l | — | <10 ppm |
| Cobalt | 1.8% | — | — | <10 ppm |
| Copper | 0.024% | — | — | <5 ppm |
| Zinc | 0.002% | — | — | <5 ppm |
| Lead | 0.003% | — | — | <5 ppm |
| Chromium | 0.001% | — | — | <5 ppm |
| Arsenic | 0.002% | — | — | <5 ppm |
| Aluminium | 0.003% | — | — | <5 ppm |
| Proton ($H^{30}$) | — | 0.3N | — | — |
| Rate of flow | 40 kg/h | 18/h | 7.5 kg/h | — |

COMPOSITION AND RATE OF FLOW OF THE AQUEOUS SOLUTION EMERGING FROM THE PLANT
(in grams per liter)

| | 9 | 10 | 14 | 53 | 51 | 52 | 11 | 16 |
|---|---|---|---|---|---|---|---|---|
| Nickel | 200 | 200 | 200 | 200 | 200 | 200 | — | — |
| Sulphur | — | — | — | — | — | — | — | — |
| Sulphate | 10 | 10 | 10 | 1 | 1 | 1 | — | — |
| Iron | 56 | 0.001 | 0.001 | 0.001 | 0.001 | 50 | — | — |
| Cobalt | 4.6 | 4.6 | 0.001 | 0.001 | 0.001 | 0.001 | — | 46 |
| Copper | 0.064 | 0.64 | <0.001 | <0.001 | <0.001 | <0.001 | — | 0.63 |
| Zinc | 0.005 | 0.005 | <0.001 | <0.001 | <0.001 | <0.001 | — | — |
| Lead | 0.007 | 0.007 | 0.007 | 0.007 | 0.0004 | 0.0004 | — | — |
| Chromium | 0.003 | 0.003 | 0.003 | 0.003 | 0.003 | <0.0005 | — | — |

-continued

| | | | | | | | | |
|---|---|---|---|---|---|---|---|---|
| Arsenic | 0.008 | 0.008 | 0.008 | 0.008 | 0.008 | 0.005 | — | — |
| Aluminium | 0.008 | 0.008 | 0.008 | 0.008 | 0.008 | <0.0005 | — | — |
| Proton (H$^+$) | 0.4 | 0.03 | 0.03 | 0.03 | 0.003 | 0.003 | 0.3 | — |
| Rate of flow | 150 l/h | 150 l/h | 150 l/h | 150 l/h | 150 l/h | 150 l/h | 150 l/h | 15 l/h |

We claim:

1. A process of recovering high purity nickel from an aqueous solution containing sulfate ions and nickel, lead, iron, chromium, arsenic and aluminum chlorides, comprising:
   (a) exposing the solution which has a concentration of nickel of at least 100 g/l to partial electrolysis employing a soluble nickel anode to obtain a deposit of elemental nickel containing elemental lead and an aqueous phase containing nickel, iron, chromium, arsenic aluminum and sulfate ions;
   (b) contacting the aqueous phase of (a) with an organic phase comprising at least one diester of orthophosphoric acid whereupon the nickel and sulfate ions remain in the aqueous phase and the other ions pass into the organic phase;
   (c) recovering the nickel from the aqueous phase of (b); and
   (d) recovering the nickel from the deposit of (a).

2. The process of claim 1 wherein the partial electrolysis of step (a) is performed by means of a piston-type electrolysis cell, the potential between the electrodes in the cell ranging from 0.3 to 0.6 volts.

3. The process of claim 1 wherein the deposit comprises about 1% of lead and is exposed to a nitric solution to thereby dissolve the lead and the nickel.

4. The process of claim 3 wherein the nickel nitrate obtained is crystallized and pyrolyzed to form nickel oxide.

5. The process of claim 1 wherein the organic phase in (b) is a liquid and comprises additionally an aromatic diluent.

6. The process of claim 5 wherein the volume ratio of aqueous phase to the organic phase is 1:4.

7. The process of claim 6 wherein the ion exchange reaction is conducted by stirring the aqueous solution with the resin.

8. The process of claim 6 wherein the ion exchange reaction is conducted by causing the aqueous solution to flow through a packed column of the resin at a temperature of from ambient to 40° C.

9. The process of claim 1 wherein the organic phase in step (b) is di-2-ethylhexyl phosphoric acid.

10. The process of claim 1 wherein the organic phase in step (b) comprises a 10% solution of di-2-ethylhexyl phosphoric acid.

11. The process of claim 1 wherein the partial electrolysis in step (a) is conducted in a cell under the following conditions:
apparent current density—66 A/M$^2$
voltage across the cell terminals—0.50 to 0.55 V
anode-cathode voltage—0.3 to 0.4 V
temperature—80° C.
pH—3 to 4

12. The process of claim 1 wherein the organic phase in (b) is in the form of a resin, the contacting of the organic and aqueous phases being conducted by means of ion exchange.

13. The process of any one of claims 1, 2 and 9-8 wherein the nickel is recovered from the aqueous phase of (b) by means of electrolysis and collected at the cathode.

* * * * *